April 14, 1959

C. V. DI PIETRO 2,881,695

BROILER

Filed May 9, 1955

INVENTOR.
Carmelo V. DiPietro
BY
Harness, Dickey & Pierce.
ATTORNEYS.

April 14, 1959 C. V. DI PIETRO 2,881,695
BROILER
Filed May 9, 1955 4 Sheets-Sheet 2
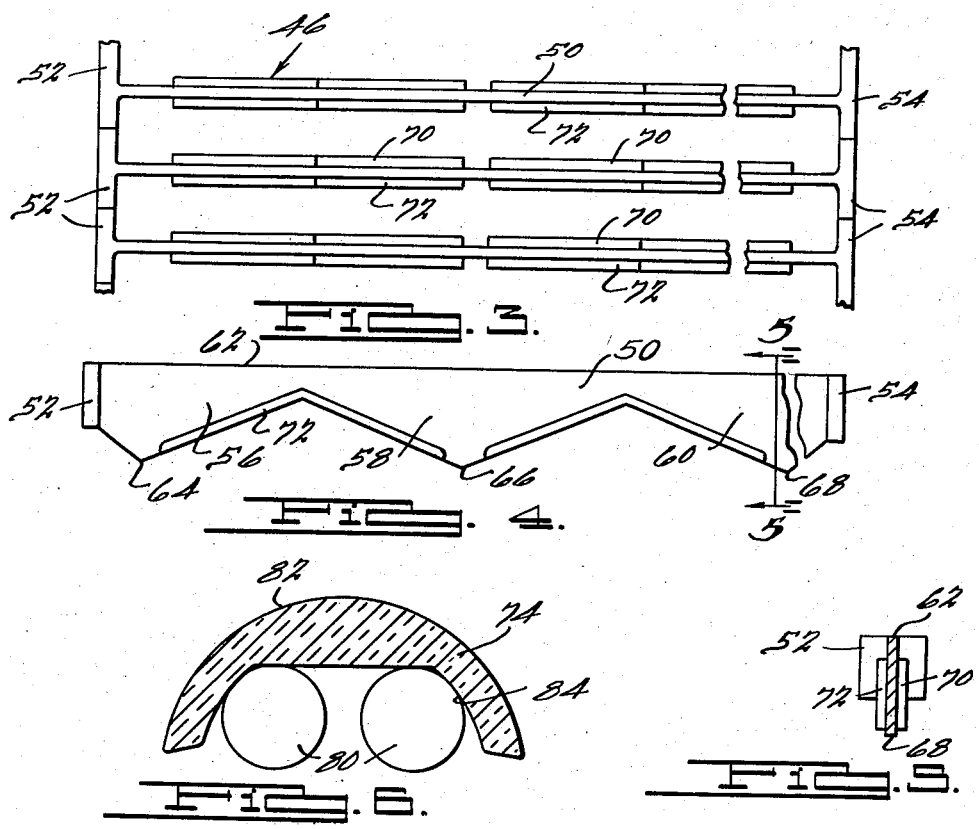
INVENTOR.
Carmelo V. DiPietro
BY
Harness, Dickey & Pierce
ATTORNEYS.

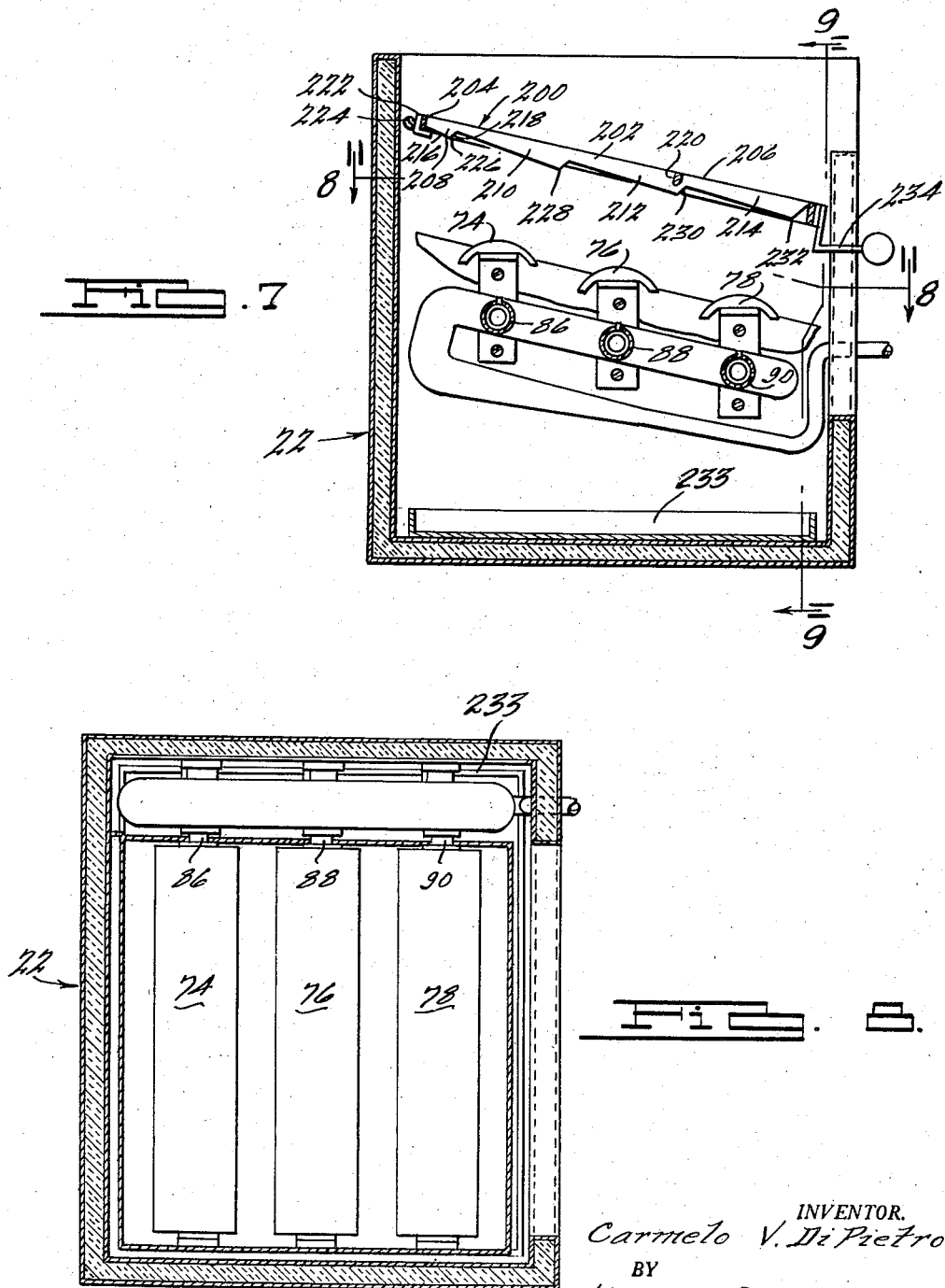

April 14, 1959 C. V. DI PIETRO 2,881,695
BROILER
Filed May 9, 1955 4 Sheets-Sheet 4

INVENTOR.
Carmelo V. DiPietro
BY
Harness, Dickey & Pierce
ATTORNEYS.

United States Patent Office 2,881,695
Patented Apr. 14, 1959

2,881,695
BROILER

Carmelo V. Di Pietro, Birmingham, Mich.

Application May 9, 1955, Serial No. 506,954

6 Claims. (Cl. 99—446)

This invention relates to cooking devices and, more particularly, to an improved broiler for broiling meats and the like.

In the broiling of meats and the like, the use of charcoal has generally been preferred because the heat generated by the live coals quickly sears the meat. The searing of the meat, in turn, causes the fat to melt with the result that the fat drips on the live coals and is ignited or vaporized. This action causes smoke and fumes to rise and impinge upon the meat and impart a savory taste to the meat thus broiled. It has been found desirable to broil the meat over the charcoal when a slight film of ashes has formed over the live coals as at that time the heat is filtered and the glow and infrared rays permit the meat to be cooked at a more desirable temperature. Furthermore, the drippage from the meat is slowed down to a point where the flame and vaporization of the juices may be advantageously controlled.

While many devices, materials and methods have been employed in the past in various endeavors to duplicate the action of charcoal in broiling meats without the use of charcoal, such prior attempts have not been entirely satisfactory and a savory flavor has not been imparted to the meats by prior devices, materials and methods.

An object of the present invention is to overcome disadvantages in prior devices, materials and methods of the indicated character and to provide an improved broiler incorporating improved means for imparting a savory flavor to meats broiled thereby without the use of charcoal.

Another object of the invention is to provide an improved broiler incorporating improved means for controlling the dripping of fats and juices from meats broiled thereby.

Another object of the invention is to provide an improved broiler which is adapted to substantially duplicate or even surpass the flavor imparted to charcoal-broiled meat and which imparts such flavor to the meat without the use of charcoal.

Another object of the invention is to provide an improved broiler that is economical to manufacture and assemble, durable, efficient and reliable in operation.

Another object of the invention is to provide an improved broiler incorporating means for controlling the broiling temperature.

Another object of the invention is to reduce the cost of broiling meats and the like and at the same time reduce the cooking time necessary to broil meat and the like.

Another object of the invention is to provide an improved broiler which substantially eliminates the generation of ashes, dust and the like heretofore normally produced in the charcoal-broiling of meat.

Still another object of the invention is to provide an improved broiler incorporating improved means for maintaining the heat, infrared radiation and the radiant energy at any desired value during the time that the meat is being broiled.

Yet another object of the invention is to provide an improved broiler incorporating improved means for collecting the fats and juices which drip from the meat during the broiling thereof.

The above as well as other objects and advantages of the present invention will become apparent from the following description, the appended claims and the accompanying drawings wherein:

Fig. 3 is an enlarged, fragmentary, top plan view of a portion of the broiler illustrated in Fig. 1;

Fig. 4 is a fragmentary, side elevational view of the structure illustrated in Fig. 3;

Fig. 5 is a transverse sectional view of the structure illustrated in Fig. 4, taken on the line 5—5 thereof;

Fig. 6 is an enlarged end elevational view of one of the radiant elements illustrated in Fig. 1;

Fig. 7 is a side elevational view of another embodiment of the invention;

Fig. 8 is a sectional plan view of the structure illustrated in Fig. 7, taken on the line 8—8 thereof;

Figures 1, 2:
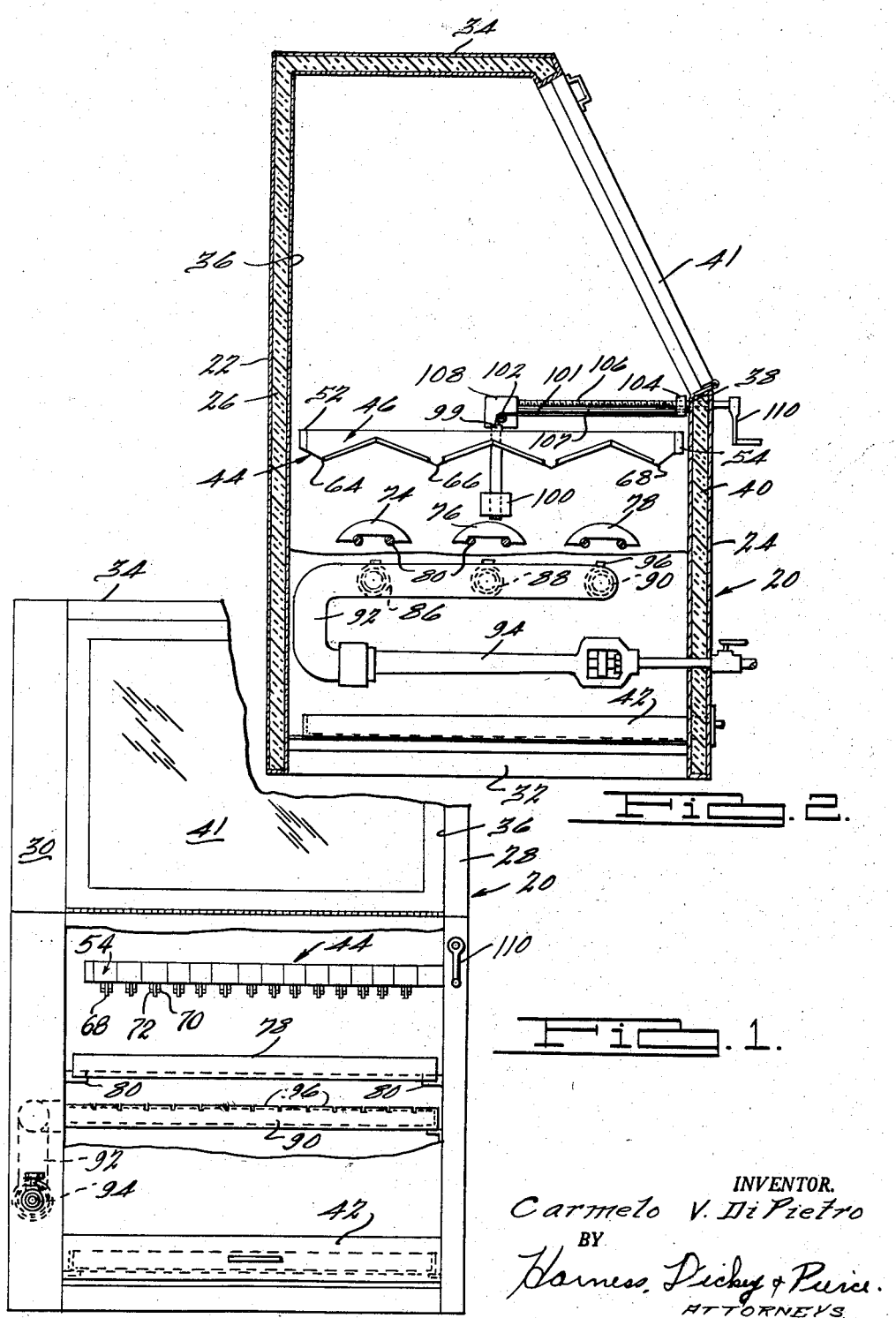
Figure 1 is a front elevational view, with portions broken away, of one embodiment of the present invention.
Fig. 2 is a sectional side elevational view of the broiler illustrated in Fig. 1.
Figure 9:
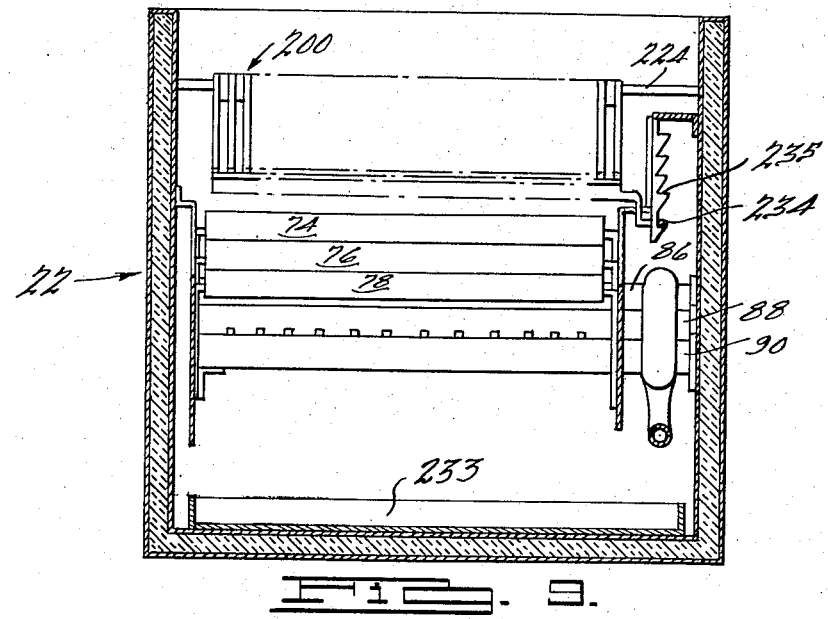
Fig. 9 is a sectional front elevational view of the structure illustrated in Fig. 7.
Figure 10:
Fig. 10 is a fragmentary, enlarged, top plan view of the rack elements illustrated in Fig. 7.

Referring to the drawings, and more particularly to Figs. 1–6, one embodiment of the invention is shown incorporated in a broiler generally designated 20 for broiling meat and the like. The broiler 20 is comprised of a cabinet member 22 which includes spaced substantially vertical front and rear walls 24 and 26 joined by spaced vertically extending side walls 28 and 30 and spaced bottom and top walls 32 and 34, the walls of the cabinet member defining a chamber 36. If desired, suitable heat insulation 40 may be included in the walls of the cabinet member. The upper edge of the front wall 24 terminates in vertically spaced relationship with respect to the top wall 34 so as to form an opening 38 providing access to the chamber 36. A door 41 is provided which is hingedly connected to the front wall 24 for swinging movement to and from closing relationship with respect to the opening 38.

In order that excess grease may be conveniently collected, a drip pan 42 is provided which is removably mounted in the lower portion of the chamber 36, the drip pan 42 covering substantially the entire area of the bottom wall 32.

A horizontally extending grill, generally designated 44, is provided which is mounted in the chamber 36 between the top and bottom walls 34 and 32. The grill 44 is comprised of a plurality of horizontally disposed rack elements 46 which extend across the chamber 36 from a position near the front wall 24 to a position near the back wall 26, the end portions of the rack members being joined together to form a unitary structure, as will be described hereinafter in greater detail.

The rack elements 46 are preferably of the configuration shown in Figs. 3, 4 and 5. As shown in Fig. 3, in plan view, each of the rack elements 46 includes an elongate relatively thin central section 50 and laterally extending end sections 52 and 54 which extend in a direction substantially perpendicular to the central section 50 and the edges of which are joined together, as by welding, to form a unitary structure.

As shown in Fig. 4, in side elevational view, the central section 50 of each rack element defines a plurality of generally triangular portions 56, 58 and 60. The upper edge 62 of the central section 50, as viewed in Fig. 4, is substantially flat and the apexes 64, 66 and 68 of the triangular portions are disposed in downwardly spaced relationship with respect to the top edge 62 of each rack element. The apexes 64, 66 and 68 are also disposed in spaced substantially coplanar relationship with respect to each other. Flanges 70 and 72 are provided on the lower edge of the rack elements, the flanges extending between the apexes and terminating in spaced relationship with respect to the apexes. With such a construction, during the broiling of the meat, the grease emanating from the meat will, in a large part, flow downwardly along the rack elements to the apexes thereof, and the grease will drip from the apexes of the rack elements. It will be appreciated, however, that a portion of the grease will drop between the rack elements, the amount of grease which is permitted to drip from the rack elements being determined by the spacing of the rack elements and by the slope of the inclined lower edges of the rack elements.

A plurality of radiant elements 74, 76 and 78 are provided which are disposed below the rack elements and which extend transversely thereof, the radiant element being supported by rods 80 carried by the side walls of the cabinet member. The radiant elements 74, 76 and 78 are preferably formed of silicon carbide, although it will be understood that other materials, such as steel, ceramic or other radiant material may be employed. The radiant elements are preferably of the cross-sectional contour illustrated in Fig. 6, and the outer surface 82 of each of the radiant elements is preferably substantially cylindrical. Each of the radiant elements defines a longitudinally extending recess 84 and the longitudinal axes of the radiant elements are preferably disposed substantially midway between adjacent apexes of the rack elements.

A plurality of burner elements 86, 88 and 90 are provided which are disposed below the radiant elements 74, 76 and 78, respectively, the longitudinal axes of the burner elements being substantially coplanar with the longitudinal axes of the associated radiant elements. The burner elements communicate with a manifold 92 which is connected to a suitable source of gas supply (not shown), a suitable buzzer air mixer 94 being interposed between the source of gas supply and the burner elements in order to provide a proper fuel/air mixture ratio. It has been found desirable to provide the burner elements with raised ports 96, as, for example, ports approximately ⅜ of an inch high and spaced apart approximately ¾ of an inch. Such a burner, when provided with the proper amount of primary air mixed with gas, provides a relatively hot flame which is desirable in heating the radiant elements to the proper broiling temperature without the use of excessive amounts of gas, the flames emitted from the burner elements being directed into the recesses 84 of the radiant elements on the underside of the radiant elements. It is an important feature of the present invention that the rack elements extend transversely of the radiant elements and that the apexes of the rack elements are disposed between or outside of the radiant elements.

In order to facilitate raising and lowering the grill 44, a marginal portion of the grill is fixed to a vertically extending support member 99 provided on one side of the chamber 36. One end portion of the support member 99 is mounted for reciprocating movement in a bearing element 100 fixed to the side wall 28 of the cabinet member. The upper end portion of the support member 99 is fixed to one end portion of a cable 101. The cable passes over a pulley 102 and the opposite end portion of the cable is fixed to a traveling nut 104 threadably mounted on a screw 106, a rod 107 being provided to prevent rotation of the nut 104. One end portion of the screw 106 is rotatably mounted in a bearing element 108 fixed to the adjacent side wall 28 of the cabinet member while the opposite end portion of the screw projects through the front wall 24 of the cabinet member and is provided with a handle 110 which facilitates rotating the screw. With such a construction, rotation of the screw in one direction effects longitudinal movement of the nut 104. The movement of the nut 104, in turn, effects raising and lowering movement of the grill 44 through the agency of the cable 101, and the support member 99. If desired, the grill may be divided into sections and means provided for individually raising and lowering the separate sections of the grill.

In the operation of this embodiment of the invention, the burner elements 86, 88 and 90 are ignited so as to heat the radiant elements to a temperature at which the radiant elements emit infrared and radiant energy. The meat that it is desired to broil is then placed on the grill 44 and supported by the upper surfaces of the rack elements 46. As previously mentioned, the apexes of the rack elements are disposed between or outside of the radiant elements so that during the broiling of the meat, the grease, fat and juices emanating from the meat will, in a large part, flow along the rack elements to the apexes of the rack elements and drop from the apexes of the rack elements between or outside of the radiant elements and into the drip pan 42. A portion of the grease, fat, and juices will, however, drop on the upper surfaces 82 of the radiant elements and the grease, fat and juices impinging on the upper surfaces 82 will produce a flame and smoke which is substantially the same as the flame and smoke produced in a charcoal broiler. The upper surfaces 82 of each of the radiant elements slopes downwardly, as viewed in Fig. 6, so that excess grease, fat and juices will run off of the upper surface 82 and drop into the drip pan to prevent excessive flame and smoke. If desired, the meat may be initially seared while subjected to a relatively high temperature and thereafter the grid elements may be moved upwardly away from the radiant elements by turning the handle 110 in the proper direction so that the broiling may be completed at a lower temperature.

It has been found desirable to provide a stiff, short, hot flame in the burner elements. Such a flame may be produced by supplying a relatively large quantity of primary air which is mixed with the gas in the buzzer mixer 94. It will be understood that other means may be provided for heating the radiant elements. For example, the radiant elements may be heated by electric heating elements or other suitable means.

Another embodiment of the invention is illustrated in Figs. 7–11. This embodiment of the invention includes the burner elements 86, 88 and 90, the radiant elements 74, 76 and 78, and the cabinet member 22. In this embodiment of the invention, the burner elements 86, 88 and 90 are disposed in spaced vertically stepped relationship, the burner element 86 being disposed above the element 88 and the element 88 being disposed above the burner element 90. The radiant elements 74, 76 and 78 are also disposed in vertically spaced, stepped relationship, the radiant element 74 being disposed above the radiant element 76, and the radiant element 76 being disposed above the radiant element 78.

Figure 11:
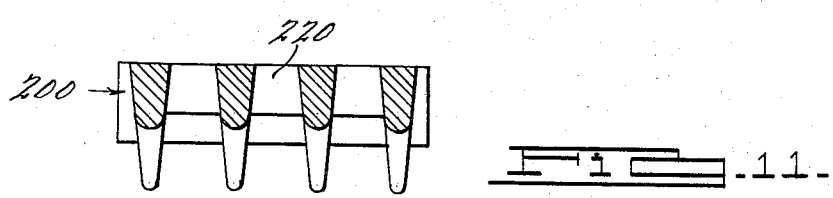
Fig. 11 is an enlarged cross sectional view of the rack elements illustrated in Fig. 10, taken on the line 11—11 thereof.

In this embodiment of the invention, a grill, generally designated 200, is provided which includes a plurality of elongate rack members 202 which are disposed in spaced substantially parallel relationship and which extend from the rear of the chamber 36 of the cabinet member to the front of the chamber 36. The opposite end portions of the rack elements 202 are secured to a substantially rectangular support member 204. As shown in Fig. 7, in elevational view, each of the rack elements includes a substantially flat upper edge 206 and a plurality of integral substantially triangular portions 208, 210, 212 and 214, Each of the triangular portions includes a relatively long, sloping edge 216 and a relatively short, sloping edge 218, the slope of the edge 216 being relatively gentle, while the slope of the edge 218 is relatively steep. The rack elements are joined by transversely extending cross pieces 220 intermediate the ends thereof in order to increase the rigidity of the grid structure. The rear edge portion of the support member 204 is pivotally connected to a mounting bracket 222 by a pivot pin 224, the mounting bracket 222, in turn, being fixed to the side walls of the cabinet member. The grid member 200 is positioned above the radiant elements so that the apexes 226 and 232 are disposed in outwardly spaced relationship with respect to the outer edges of the radiant elements 74 and 78 while the apexes 228 and 230 are disposed between the radiant elements 74 and 76, and the radiant elements 76 and 78, respectively, so that grease may drip between said radiant elements into drip pan 233. An adjustment lever 234 is secured to the forward portion of the support member 204, the adjustment lever being adapted to bear against selected abutment stops 235 provided adjacent the front wall of the cabinet member. With such a construction, the adjustment lever 234 may be selectively positioned on the abutment stops so as to vary the angular position of the grid member. An important advantage of this construction resides in the fact that the dripping of the grease may be controlled by varying the angular position of the grid structure. It will also be noted that the upper surfaces of the rack elements slant forwardly and downwardly. Such a construction increases the visibility of the operator during the broiling of the meat. As shown in Fig. 11, the rack elements preferably taper inwardly in transverse cross section, so as to facilitate the flow of the juice and grease to the apexes of the rack elements. With such a construction, a large portion of the juice and grease emanating from the meat will flow along the rack elements and fall from the rack elements between the radiant elements or in outwardly spaced relationship with respect to the radiant elements. Another advantage of this embodiment of this invention resides in the fact that the grid structure may be pivoted to effect temperature control for the front area of the grid. This feature is desirable because oftentimes when cooking relatively thick cuts of meat, or when cooking fowl, after the meat has been seared, it is desirable to continue the cooking at a lower heat. It will also be noted that since the grid is pivoted at the rear portion thereof, the space between the radiants and the rear portions of the grid remains substantially constant whereas the space between the front portion of the grid and the radiant elements varies between relatively wide limits.

While preferred embodiments of the invention have been shown and described, it will be understood that various changes and modifications may be made without departing from the spirit of the invention.

What is claimed is:

1. In a broiler, the combination of supporting means, a plurality of spaced radiant elements mounted on said supporting means, means for heating said radiant elements including heating elements disposed below and shielded by said radiant elements, a grill mounted on said supporting means upwardly of said radiant elements, said grill having a plurality of spaced parallel upper edge portions defining a flat cooking surface and adapted to support meat to be broiled, said grill also having a plurality of reversely sloped lower edge portions extending transversely of said radiant elements, said lower edge portions terminating at their lower ends at a plurality of spaced low points, each of which is vertically aligned with one of the spaces between said spaced radiant elements so that said low points are disposed only between the radiant elements, said reversely sloped lower edge portions being each inclined at a substantial angle relative to the horizontal such that grease flowing to said lower edge portions will flow downwardly along said lower edge portions to said low points, and grease collecting means disposed below said heating elements and adapted to catch grease which drips from said low points.

2. The combination as defined in claim 1, wherein said grill includes a plurality of thin vertically disposed sections above and extending transversely of said radiant elements and tapering in cross section to a minimum thickness at its lower edge, each of said sections having its lower edge formed to define said lower edge portions and including a pair of said lower edge portions individual to each of said radiant elements.

3. The combination as defined in claim 2, wherein said grill comprises a plurality of separately formed rack elements, each of which includes at least one of said sections extending transversely of said radiant elements.

4. The combination defined in claim 1, wherein said lower edge portions terminate at their upper ends at high points disposed over said radiant elements and wherein said grill has flanges extending laterally outwardly therefrom at each of said lower edge portions and extending from said high points downwardly toward and terminating adjacent to and in spaced relation from said low points.

5. The combination as defined in claim 1, wherein said grill is inclined relative to the horizontal to provide an inclined cooking surface and including means for adjusting the inclination of said grill.

6. The combination as defined in claim 1 including means for raising and lowering said grill relative to said radiant elements.

References Cited in the file of this patent

UNITED STATES PATENTS

| | | |
|---|---|---|
| 615,548 | Guinean | Dec. 6, 1898 |
| 868,753 | Barrett | Oct. 22, 1907 |
| 1,004,401 | Fey | Sept. 26, 1911 |
| 1,010,169 | Norbeck | Nov. 28, 1911 |
| 1,103,992 | Murray | July 21, 1914 |
| 1,133,850 | Garraux | Mar. 30, 1915 |
| 1,329,421 | McCormick | Feb. 3, 1920 |
| 1,480,119 | Schey | Jan. 8, 1924 |
| 1,665,225 | Simek | Apr. 10, 1928 |
| 1,963,817 | Wiederhold | June 19, 1934 |
| 2,052,067 | Zeimet | Aug. 25, 1936 |
| 2,180,868 | Dunning et al. | Nov. 21, 1939 |
| 2,198,134 | Spiegl | Apr. 23, 1940 |
| 2,253,834 | Volks | Aug. 26, 1941 |
| 2,283,853 | Frick | May 19, 1942 |
| 2,594,914 | Grosskloss | Apr. 29, 1952 |
| 2,720,827 | Del Francia | Oct. 18, 1955 |
| 2,723,617 | Dreyfus | Nov. 15, 1955 |

FOREIGN PATENTS

| | | |
|---|---|---|
| 832,111 | France | Sept. 22, 1938 |
| 936,111 | France | July 9, 1948 |